J. BRICKETT
Seed Planter.
No. 229,028.
Patented June 22, 1880.
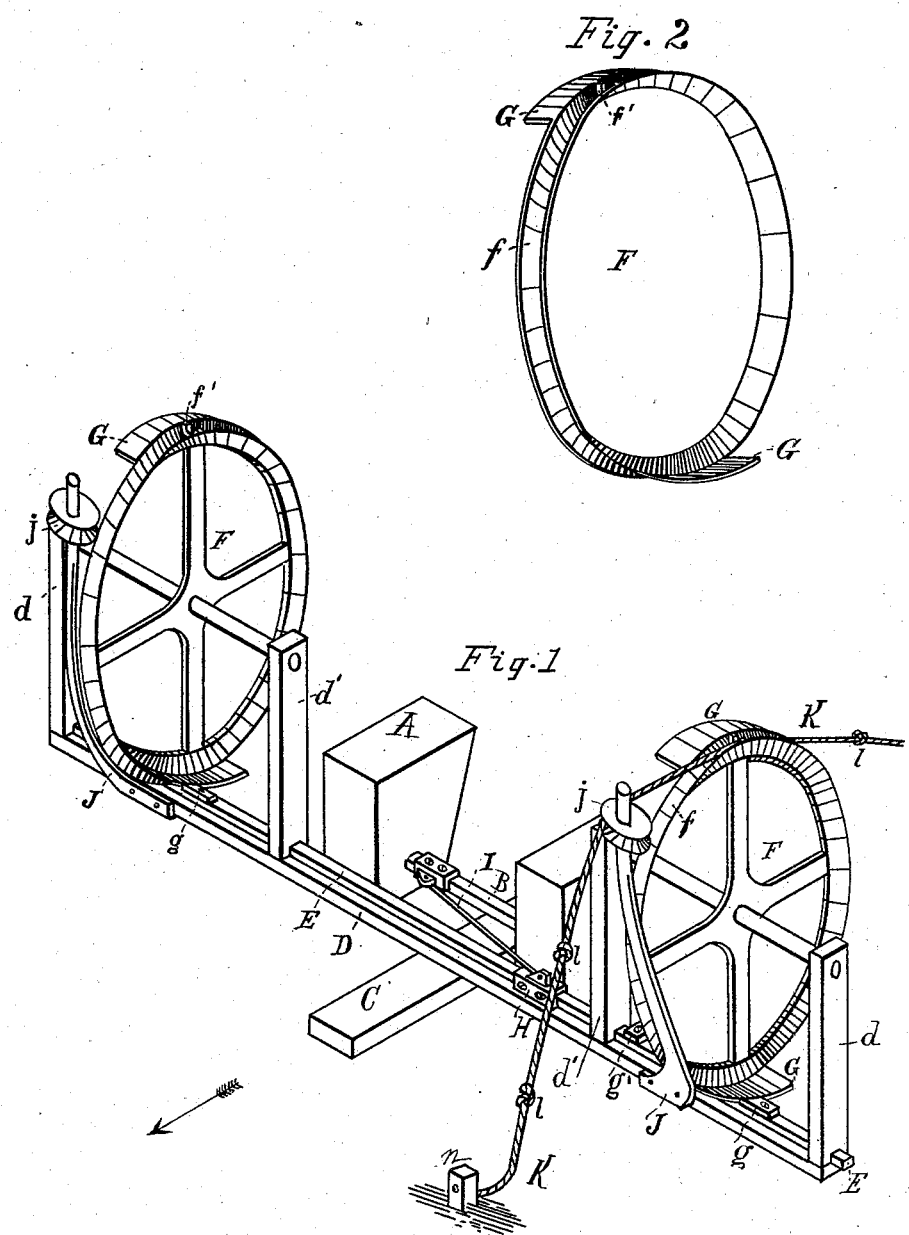

UNITED STATES PATENT OFFICE.

JOHN BRICKETT, OF DANFORTH, ILLINOIS, ASSIGNOR OF TWO-THIRDS OF HIS RIGHT TO HOMER A. GRISWOLD AND GEORGE W. FLOTT, OF SAME PLACE.

SEED-PLANTER.

SPECIFICATION forming part of Letters Patent No. 229,028, dated June 22, 1880.

Application filed October 28, 1879.

*To all whom it may concern:*

Be it known that I, JOHN BRICKETT, of Danforth, in the county of Iroquois and State of Illinois, have invented a new and useful Improvement in Seed-Planters, of which the following is a specification.

My invention relates to check-rowers for seed-planters which derive their power (to reciprocate the connecting-rod of the slide-valve of the hopper containing the seed) from a rope or linked rods extending across the field in which the seed are to be dropped.

Heretofore these devices have been constructed of cams, pinions, and gear-wheels, or of forked arms, rocker-plates, &c., having vertical guide-arms or a series of guide-pulleys arranged in such relation thereto that the chain of linked rods or knotted ropes guided by them must be bent at a right angle, or substantially so, to operate the reciprocating mechanism. These devices are objectionable because of their complicated construction, and for the reason that the linked rod or chain upon the radial arms is strained and the rope upon the pulleys is soon worn out by the friction caused by the sharp turns around the pulleys. Furthermore, by reason of these abrupt turns, they are not adapted for using a wire cable to operate them.

The object of my invention is to produce a simple and effective attachment of few parts, requiring no abrupt curves or bends in the lines used for operating it, thereby admitting of the use of a stiff and durable wire cable instead of a pliable rope, which is soon worn out by friction, or of linked rods, unwieldly in their operation.

In the accompanying drawings, in which similar letters of reference indicate like parts, Figure 1 is a perspective of my device, showing its attachment to an ordinary seed-planter. Fig. 2 is a perspective of the rim of my cam-wheel and the grooved diaphragm on its periphery.

A represents the hoppers, B the slide-bar for operating the valves, and C the central longitudinal bar, of an ordinary seed-planter.

Upon the bar C, or to the hoppers, I secure, by bolts or other suitable means, the transverse bar D, for supporting the mechanism to operate the sliding bar of the hoppers. On each end of the bar D, I secure uprights $d\ d$, and at a suitable distance from them, toward the center of the bar, I secure similar uprights $d'\ d'$, all of which are slotted at their bottoms to permit the reciprocating bar E of the attachment to move freely through them.

F F are wheels at each end of the supporting-frame, having beveled wings or cams G G extending on either side of and at opposite points on the rims in a line with their axis, and their periphery grooved, as shown at $f$, and having notched diaphragms $f'$, the purpose of which will be hereinafter fully explained.

On the sliding bar E, between the standards $d\ d'$, I secure beveled studs $g\ g'$, at a distance from each other equaling the width of the periphery and one of the cam-wings of the wheel. These studs are beveled on their edges in opposite directions to correspond with the cams on each side of the wheels, so that when the wheels are revolved the cams act alternately upon them and reciprocate the bar E.

H is a clamp on the sliding bar E, to which is attached the rod I, for connecting the sliding bar of the attachment to the reciprocating bar of the hoppers. This bar is made adjustable, by set-screws or other suitable means, to adapt it to machines varying in width. The beveled lugs are also made adjustable on the sliding bar to regulate the length of stroke of said bar, for it will be perceived that if the lugs are farther apart than shown the cams will not strike them at their base, but farther up their inclines. Hence a shorter stroke is made by the reciprocating bar to which the lugs are attached.

J are bracket-arms extending upwardly at one side of the cam-wheels, and having pulleys $j$ pivoted thereon to guide the rope.

K is a cable or cord laid in a line or at a slight angle from one end of the field to the other, and having suitable enlargements or knots $l$ at intervals of its length.

I prefer to attach the cable or cord to stakes placed at an angle at each end of the field to a direct line through the length of the field, so that by having about twelve feet of slack in the cable I may make two trips with the machine before having to move the stakes n at the end of the field to the opposite angle. As the cable is only connected to one of the cam-wheels at a time, it will be seen that if I place the planter a little to one side of the stake at the lower end of the field and place the cable on the wheel farthest from it the slack will be taken up, and the cable, extending from the wheel to the other end of the field, will be in a straight line. When the machine is reversed to return and is placed in line with the cable—i. e., in position at the end stake—the cable is then stretched to take up the slack; and thus the cable is not only an actuating medium, but a guide-line for the driver.

The attachment and operation of my device are as follows, viz: I bolt the check-rower to any ordinary seed-planter and connect the reciprocating bar by a rod to the slide-valve of the hoppers. The machine is then placed as above described, and the knotted cable is laid in the grooves of the diaphragm on the cam-wheel and is placed in the groove of the guide-pulley on the bracket J. The planter is driven forward in the direction indicated in the drawings. The enlargements or knots in the cable or cord strike against the diaphragm and are not released until the drive-wheel has passed beyond the beveled studs, thus giving the sliding bar a lateral movement in its passage. The weight of the cable or rope turns the wheel until cam G is brought in contact with the stud. Then the rope slips along until one of the knots or enlargements comes in contact with a grooved diaphragm, when the operation above described is repeated, and so on, until the end of the field is reached and the machine is turned, as I have already indicated.

I wish it to be understood that I do not confine myself to the exact construction shown and described, for I may have any number of cam-wings upon my wheel; and I may also operate said wheel, with but slight variation in the reciprocating bar, in a horizontal as well as a vertical position.

Having thus described my invention, what I claim, and desire to secure by Letters Patent, is—

1. In a check-rower, the combination, with a transverse reciprocating bar connected to the valve-rod of a seed-planter, of a wheel provided with cam-wings and arranged to revolve at right angles to and reciprocate said bar, said wheel adapted to carry and to revolve in line with an actuating-cord extending across the field, whereby the seed-valves are intermittently operated and the bending or crimping of said cord avoided, as described and shown.

2. The combination, with a grooved wheel, F, notched as described, and provided with one or more wings, G, of a bar, E, provided with lugs g g', intermittently engaging with the grooved wheel, whereby the said bar is reciprocated, as and for the purpose described.

3. The combination, with the wheel G, constructed and arranged as shown, actuating-cord K, and bracket-arm J, of the reciprocating rod E, lugs g g', adjustable clamp H, and rod I, substantially as shown and described.

JOHN BRICKETT.

Witnesses:
FERNANDO WOLFE,
GEO. E. TAYLOR.